United States Patent [19]

Descroix et al.

[11] Patent Number: 4,756,984
[45] Date of Patent: Jul. 12, 1988

[54] ACTIVATABLE BATTERY USING THE LI/SO₂CL₂ COUPLE

[75] Inventors: Jean-Pierre Descroix, Fontenay Sous Bois; Véronique Danel, Rosny Sous Bois; André Petit, Le Raincy, all of France

[73] Assignee: Saft, S.A., Romainville, France

[21] Appl. No.: 8,668

[22] Filed: Jan. 30, 1987

[30] Foreign Application Priority Data

Feb. 4, 1986 [FR] France ................... 86 01492

[51] Int. Cl.⁴ ........................................... H01M 6/14
[52] U.S. Cl. ..................................... 429/116; 429/118; 429/196; 429/199
[58] Field of Search ............... 429/118, 116, 194, 196, 429/197, 199

[56] References Cited

U.S. PATENT DOCUMENTS

| | | | |
|---|---|---|---|
| 3,619,298 | 11/1971 | Jammet et al. | 429/116 |
| 3,930,885 | 1/1976 | Dey | 429/116 |
| 4,150,198 | 4/1979 | Domeniconi et al. | 429/116 |
| 4,499,160 | 2/1985 | Babai et al. | 429/116 X |
| 4,612,265 | 9/1986 | Connolly et al. | 429/196 |

FOREIGN PATENT DOCUMENTS 2056752  3/1981  United Kingdom .

Primary Examiner—Anthony Skapars
Attorney, Agent, or Firm—Kenyon & Kenyon

[57] ABSTRACT

A small quantity of bromine (0.1 to 1 m/liter of electrolyte) is added to the electrolyte of an activatable Li/SO₂Cl₂ battery. This small amount of bromine acts as a catalyst, not as a depolarizer. Considerable improvement is thus obtained in the electrical performance of the battery.

3 Claims, 3 Drawing Sheets

ACTIVATABLE BATTERY USING THE LI/SO₂CL₂ COUPLE

The present invention relates to activatable batteries using the $Li/SO_2Cl_2$ couple and intended to provide rapid discharge at high current density, e.g. at about 100 mA/cm².

BACKGROUND OF THE INVENTION $Li/SOCl_2$ and $Li/SO_2Cl_2$ batteries capable of operating under such conditions are known.

$Li/SO_2Cl_2$ batteries suffer from a problem which does not occur in $Li/SOCl_2$ batteries; namely a high degree of cathode polarization. In order to remedy this problem it is possible to use cathodes which contain platinum or cathodes of active carbon having a large surface area per unit volume. These solutions are expensive or difficult to implement in the form of a porous support.

The aim of the present invention is to solve the above problem while providing cathodes for $Li/SO_2Cl_2$ batteries using a technology analogous to that used for $Li/SOCl_2$ batteries.

An article by Murphy, Krehl and Liang which appeared in Proc. 16th Intersoc. Energy Conversion Engineering Conf. (The American Soc. of Mechanical Engineers NY 1981 page 97) studies the effects of adding a halogen to the electrolyte of a non-activatable $Li/SO_2Cl_2$ battery, and concludes that it is advantageous to add chlorine to $SO_2Cl_2$ while excluding the other halogens. According to this article, the addition of chlorine increases safety margins when using batteries at temperatures lying in the range −32° C. to +150° C.

In order to improve the discharging conditions of activatable $Li/SO_2Cl_2$ batteries, the Applicant has discovered that there is no advantage in adding chlorine, but in contrast adding bromine to the electrolyte provides surprising improvements. This is because the bromine acts as a catalyst and not as a polarizer.

SUMMARY OF THE INVENTION

The present invention provides a activatable battery using the $LiSO_2Cl_2$ couple for providing rapid discharges at high current densities of about 100 mA/cm², the battery comprising a housing containing a plurality of electrically connected battery cells, each comprising a lithium anode, a separator, and a cathode, together with an electrolyte tank and activation means for inserting said electrolyte into said housing, said electrolyte also serving as the positive active material, the battery including the improvement whereby said electrolyte additionally contains bromine at a concentration lying in the range 0.1 moles per liter to 1 mole per liter of electrolyte, and preferably lying in the range 0.2 moles/liter to 0.5 moles/liter, with the bromine acting as a catalyst and not as a depolarizer.

The solute is preferably selected from $AlCl_3$ or $LiAlCl_4$ and at a concentration lying in the range 1 mole per liter to 4 moles per liter.

BRIEF DESCRIPTION OF THE DRAWINGS

An embodiment of the invention is described by way of example with reference to the accompanying drawings, in which.

MORE DETAILED DESCRIPTION

Figure 1:
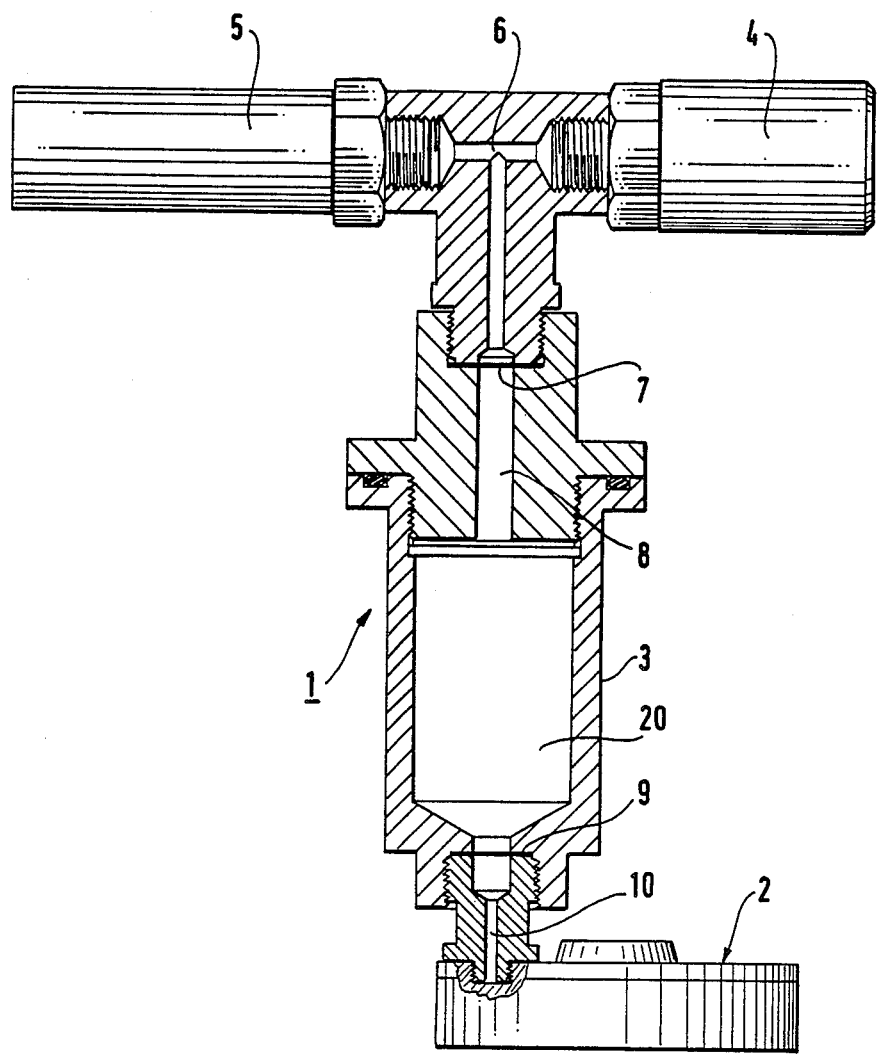
FIG. 1 is a diagrammatic partial section through an activatable battery in accordance with the invention.

FIG. 1 shows a battery 1 comprising a housing 2 containing the various electrochemical items which are described below with reference to FIG. 2, an electrolyte tank 3, and an activating device. The activating device comprises an inlet for argon under pressure 4 associated with a pressure sensor 5 and intended to direct argon under pressure via a duct 6 against a diaphragm 7 which tears to allow free passage to the inlet 8 to the electrolyte tank 3. This causes the electrolyte 20 to be expelled by virtue of the pressure tearing a second diaphragm 9 and thus allowing the electrolyte to penetrate into the housing 2 via the duct 10.

Figure 2:
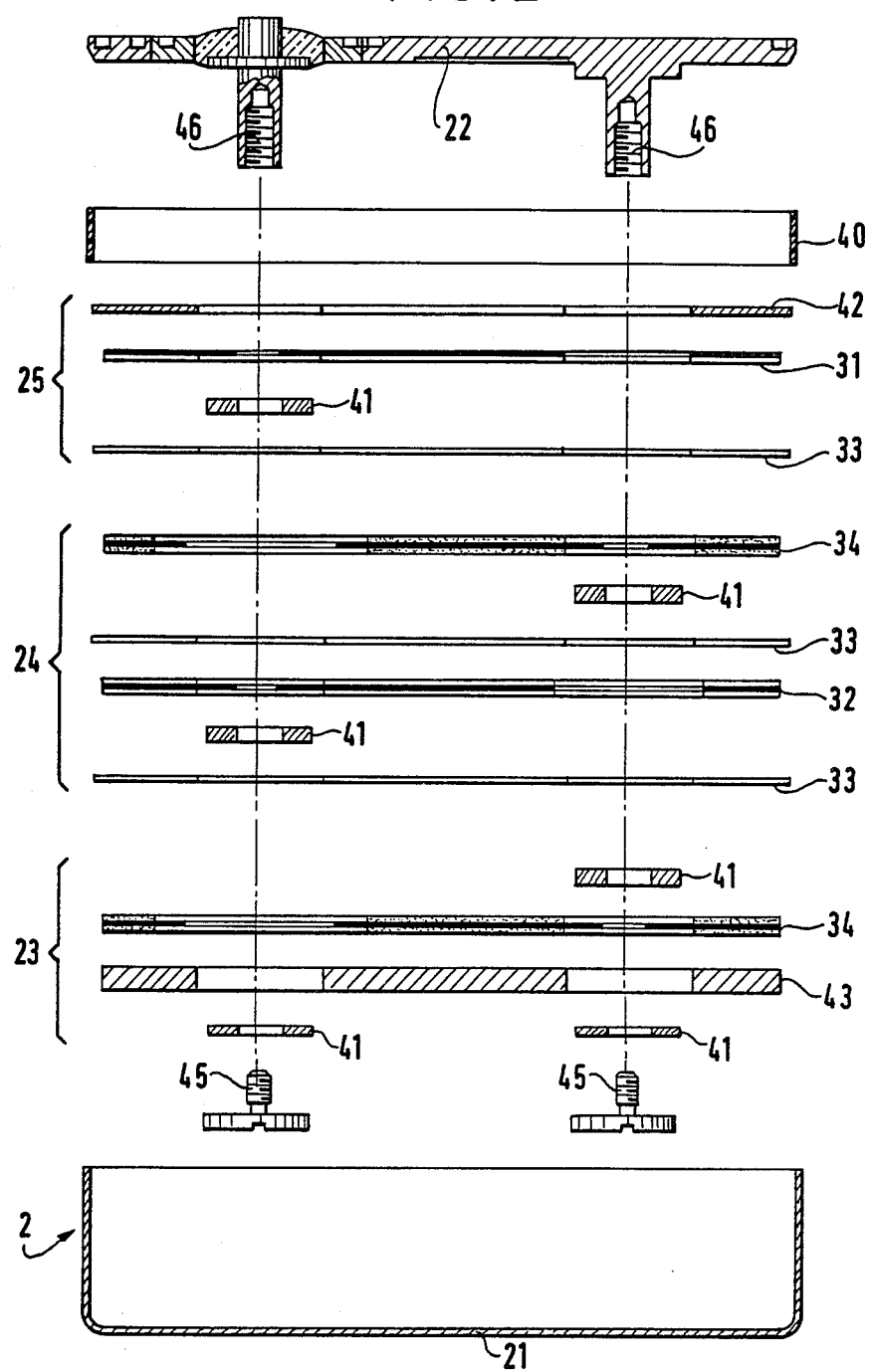
FIG. 2 is an exploded section view of the FIG. 1 battery with its activating means omitted.

FIG. 2 shows the content of the battery housing 2 which is closed by a lid 22. The housing 2 comprises a stack or pile constituted by a bottom half-cell 23, six identical intermediate cells represented by a cell referenced 24, and a top half-cell 25.

The top half-cell 25 is constituted by a single lithium anode 31 and a separator 33. Each intermediate cell 24 comprises in succession: a cathode 34; a separator 33; a double lithium anode 32; and a separator 33. The bottom half-cell comprises a cathode 34.

Various PTFE spacers and wedges are referenced 40 to 43, and screws 45 are provided to cooperate with tapped bores 46 provided in the lid 22.

In all, the stack comprises:
seven cathodes, each of which is 0.8 mm thick and each of which is constituted by an electro-formed nickel collector which is 0.1 mm thick and which is coated with acetylene black by means of a binder such as polytetrafluoroethylene (PTFE);
seven 0.35 mm thick lithium anodes; and
thirteen 0.15 mm thick glass fiber separators.

The electrodes are 64 mm in diameter. The axis area of each cell is 3.5 dm². The volume of electrolyte in the housing is 25 cm³.

EXAMPLE 1

The electrolyte solvent is $SO_2Cl_2$, the solute is $LiAlC_4$ at a concentration of 3 M per liter. This prior art cell is discharged at 20° C. at a current density of 6A/dm². Its discharge voltage U plotted in volts as a function of time t plotted in minutes is given by curve A in FIG. 3.

EXAMPLE 2

0.5 M per liter of chlorine is added to the electrolyte and curve B is obtained. A fleeting beneficial effect of chlorine can be seen at the beginning of the discharge, but curve B rapidly joins curve A representative of discharge using $SO_22Cl_2$ on its own.

EXAMPLE 3

In accordance with the invention 0.5 M of bromine is added to the electrolyte. The resulting curve is curve C. The improvement of the discharge curve is very marked and may be attributed to a catalytic effect of bromine.

EXAMPLE 4

The bromine of the third example is replaced by iodine (curve D). A small improvement is observed over curve A at the beginning of discharge, but overall the resulting performance is considerably less good than that obtained with bromine.

EXAMPLES 5-7

In these examples the concentration of bromine in the electrolyte was modified.

Figure 3:
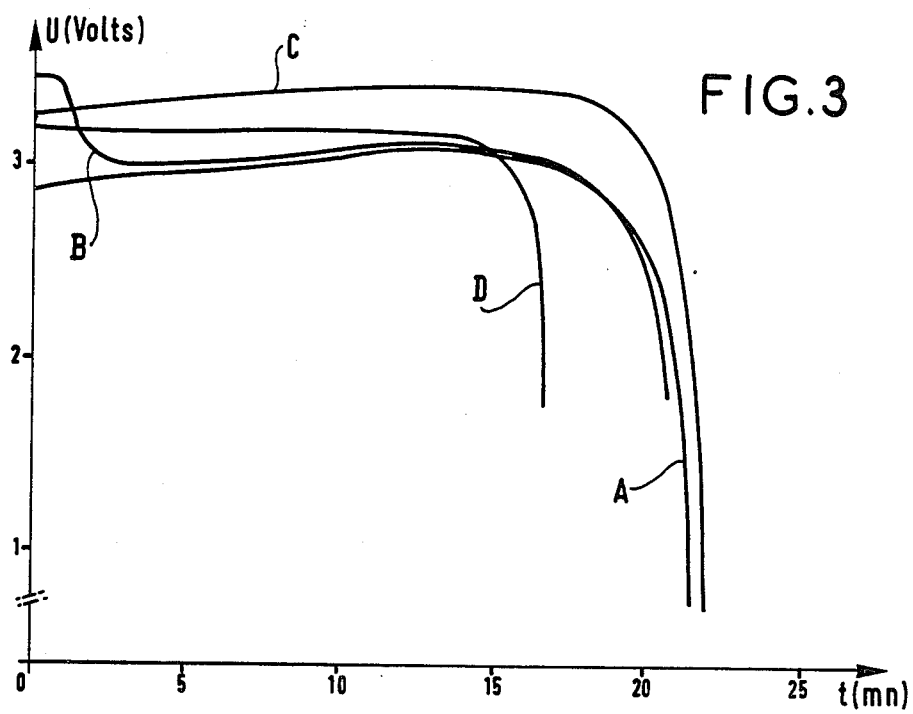
FIG. 3 is a graph plotting the discharge curves of a battery in accordance with the invention and of other batteries not in accordance with the invention, with discharge U being plotted in volts as a function of time t in minutes.
Figure 4:
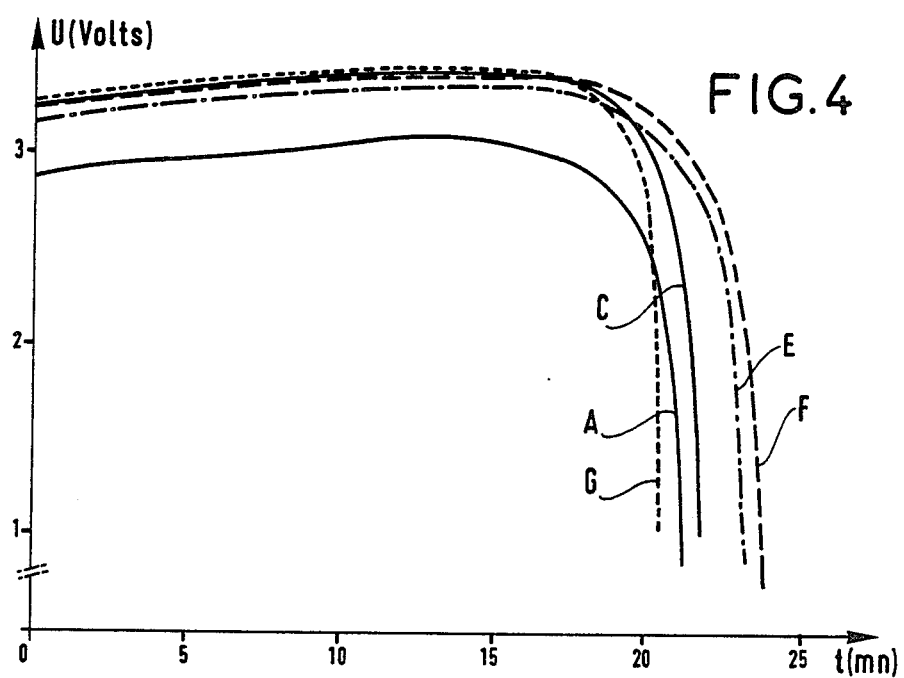
FIG. 4 is a graph plotting a plurality of discharge curves for various batteries in accordance with the invention containing different percentages of bromine in the electrolyte, with discharge U being plotted in volts as a function of time t plotted in minutes.

FIG. 4 reproduces curves A and C of FIG. 3. Curve E corresponds to a concentration of 0.1 M/liter of bromine, curve F corresponds to a concentration of 0.25 M/liter, and curve G corresponds to a concentration of 1 M/liter.

In all of these cases, a marked improvement in the discharge is observed relative to the performance of prior art batteries. The catalytic effect is clearly shown by example 5. In this example, 30 cm$^3$ of electrolyte ($SO_2Cl_2$-$LiAlCl_4$ 3 M-$Br_2$ 0.1 M) have been injected into the cell. This cell delivered 22 amps for a period of twenty two minutes, giving a capacity of 8 Ah representing 0.3 Faradays at a level of 3.2 volts.

However, the quantity of injected bromine ($0.1 \times 30/1,000 = 0.003$ mole) represents no more than 0.006 Faradays.

If the bromine was being consumed instead of acting as a catalyst in the reduction of $SO_2Cl_2$, the capacity delivered at the 3.2 volts level would have been limited to 0.016 Ah, i.e. fifty times less than the value actually obtained.

Naturally, the invention is not limited to the examples described above. In particular, the structure of the stack or pile could be modified and other solutes could be used.

We claim:

1. An activatable battery using the $Li/SO_2Cl_2$ couple for providing rapid discharge at high current densities of about 100 mA/cm$^2$, the battery comprising a housing containing a plurality of electrically connected battery cells, each cell comprising a lithium anode, a separator, and a cathode, together with an electrolyte tank connected to the housing and containing an electrolytic salt selected from the group consisting of $AlCl_3$ and $LiAlCl_4$, the salt being dissolved in $SO_2Cl_2$, and activation means for introducing said electrolyte into said housing, said electrolyte also serving as the positive active material, the battery including the improvement whereby said electrolyte additionally contains bromine at a concentration lying in the range 0.1 moles per liter to 1 mole per liter of electrolyte, with the bromine acting as a catalyst and not as a depolarizer.

2. An activatable battery according to claim 1, wherein the electrolytic salt concentration lies in the range 1 M/liter to 4 M/liter.

3. An activatable battery according to claim 1 wherein the concentration of bromine lies in the range 0.2 moles per liter to 0.5 moles per liter of electrolyte.

* * * * *